United States Patent [19]

Hagiwara et al.

[11] Patent Number: 5,790,232
[45] Date of Patent: Aug. 4, 1998

[54] SPECTACLE LENS AND MANUFACTURING METHOD THEREOF

[75] Inventors: Susumu Hagiwara, Hiratsuka; Makoto Fukuyama, Koshigaya; Satoru Kimura, Kawasaki, all of Japan

[73] Assignee: Nikon Corporation, Tokyo, Japan

[21] Appl. No.: 541,595

[22] Filed: Oct. 10, 1995

[30] Foreign Application Priority Data

Oct. 31, 1994 [JP] Japan ................................. 6-267592

[51] Int. Cl.$^6$ ................................. G02C 7/02; G02C 13/00
[52] U.S. Cl. ............................. 351/177; 351/159; 351/178
[58] Field of Search .................................. 351/177, 178, 351/159

[56] References Cited

U.S. PATENT DOCUMENTS

| | | | |
|---|---|---|---|
| 4,557,076 | 12/1985 | Helbrecht | 51/71 |
| 4,656,590 | 4/1987 | Ace | 364/474 |
| 4,912,880 | 4/1990 | Haddock et al. | 51/101 |

FOREIGN PATENT DOCUMENTS

| | | |
|---|---|---|
| 0 061 918 | 10/1982 | European Pat. Off. . |
| 0 092 364 | 10/1983 | European Pat. Off. . |
| 0 576 268 | 12/1993 | European Pat. Off. . |
| 2 547 930 | 12/1984 | France . |
| 38 01 384 | 7/1989 | Germany . |
| 42 21 377 | 1/1993 | Germany . |

OTHER PUBLICATIONS

English abstract of Japanese Patent Application Laid–Open No. 5–341238 (Dec. 24, 1993).
English abstracts of Japanese Patent Application Laid–Open No. 6–175087 (Jun. 24, 1994).

*Primary Examiner*—Scott J. Sugarman
*Attorney, Agent, or Firm*—Shapiro and Shapiro

[57] ABSTRACT

A method of manufacturing a pair of spectacle lenses, comprises a step of adjusting lens curves of the right and left lenses by making a relatively large lens curve of an R1 surface of one lens of the pair of right and left lenses inset in the approximate to a relatively small lens curve of the R1 surface of the other lens of the pair.

45 Claims, 5 Drawing Sheets

S+1.00   C+1.00          S+3.00   C+1.00

S−1.00                   S−3.00

SPECTACLE LENS AND MANUFACTURING METHOD THEREOF

BACKGROUND OF THE INVENTION

1. Field of the Invention

The present invention relates to a manufacturing method of and a manufacturing system for manufacturing and supplying a spectacle lens optimal to a user in accordance with a prescription of the user and also a spectacle lens manufactured and supplied thereby.

2. Related Background Art

Generally, a shape of a lens used for a spectacle is round before being machined, and an edge thickness thereof is fixed. For insetting the lens in a spectacle frame, the lens has to be machined in accordance with frame dimensions. Recently there has been considerable increasingly demand for decreasing a weight of the spectacles and thinning the lenses, and there has also been an attempt to improve insetting lenses that are as thin as possible in the spectacle frame. Specifically, a machining method known as an outer shape designation machining is employed as a measure for the improvement. According to this method, the user chooses a spectacle frame, a minimum outer diameter of the lens that can be inset in this frame is measured and a pre-machining lens having an outer diameter satisfying the minimum outer diameter is selected and then machined in accordance with the frame dimensions. The outer shape designation machining will be explained with reference to FIG. 6. As illustrated in FIG. 6, in the case of a (+) lens, a lens that is smaller in terms of its central thickness, edge thickness and weight is obtained by selecting and machining a lens having a minimum outer diameter of 50 mm enough to be inset in the frame than by selecting a premachining lens having an outer diameter of, e.g., 65 mm and thereafter machining an edge portion of the lens in accordance with dimensions of the spectacle frame. In general, this work is conducted in an optician's shop. Also, there was a machining method based on an ET (Edge Thinning) method as another machining method. This method is effective in an astigmatism lens. Moreover, there could be recently done an accurate measurement of a round shape of the lens inset in the spectacle frame mechanically traced by a device known as a tracer. When the exact round shape is measured, it is possible to machine the lens exhibiting optimum properties such as, e.g., a lens edge thickness and a lens central thickness. According to the lens machined by this method, the thinnest lens corresponding to the prescription of the user can be machined at present (however, excluding a lens involving the use of a base material exhibiting a high refractive index). Accordingly, the following system was proposed. The device known as the tracer for mechanical tracing is installed in the optician's shop, and the round-shape data and the data on the prescription such as a lens power of the user are transmitted to a lens maker for actually machining the lens in the round shape, wherein the machining thereof is performed. The thus machined lens is sent back to the optician's shop. According to this system, the optician's shop is not required to effect the round shape machining and the bevel edge machining that have hitherto been conducted in the optician's shop. It is therefore feasible to omit technical training of a worker in the optician's shop.

With these improvements, the lens exhibiting the optimum properties corresponding to the nature of the eyes of the user can be manufactured.

A variety of improvements described above make it possible to manufacture the lens corresponding to the user and thin the lens down to an extent optimal to the user. However, the prescription for the lens powers of the right and left lenses largely differ depending on the user. In this case, if each of the right and left lenses is manufactured by the above methods, it may happen that the lenses are inset in the spectacle frame in a state where the central thicknesses and the edge thicknesses or the lens curves of the right and left lenses are different. A problem arises, wherein the spectacles in this state have ill-balanced right and left lenses, resulting in an undesirable outer shape (see FIGS. 7A and 7B). Further, if the imbalanced right and left lenses are used for two-point frame spectacles which have recently gained an increased number of users, a problem is that a difference in the edge thickness between the right and left lenses becomes especially conspicuous when using such imbalanced right and left lenses.

SUMMARY OF THE INVENTION

It is a primary object of the present invention to provide well-balanced spectacles with almost no difference in terms of lens curve and thickness between right and left lenses even when there is a difference in lens power between the right and left lenses.

To accomplish the above object, according to a first aspect of the present invention, there is provided a method of manufacturing a spectacle lens, comprising a spectacle lens frame insetting step of insetting a pair of right and left lenses in a spectacle frame. The insetting step includes a step of adjusting lens curves of the right and left lenses by making a relatively large lens curve of an R1 surface of the lens of the pair of right and left lenses inset in the spectacle frame approximate to a relatively small lens curve of the R1 surface of the lens thereof.

According to a second aspect of the present invention, there is provided a method of manufacturing a spectacle lens, comprising a spectacle lens frame insetting step of insetting a pair of right and left lenses in a spectacle frame. The insetting step includes a step of adjusting lens thicknesses of the right and left lenses by making a thickness of the lens having a relatively large central thickness and a relatively large edge thickness with respect to the pair of right and left lenses inset in the spectacle frame approximate to a thickness of the lens having a relatively small central thickness and a relatively small edge thickness of the lens thereof.

According to a third aspect of the present invention, there is provided a method of manufacturing spectacles, comprising a spectacle lens frame insetting step of insetting a pair of right and left lenses in a spectacle frame. The insetting step includes a step of adjusting a lens curve and a frame curve by making a lens curve of an R1 surface of each of the pair of right and left lenses inset in the spectacle frame to the frame curve of the front of the spectacle frame.

According to a fourth aspect of the present invention, there is provided a method of manufacturing spectacles, comprising a spectacle lens frame insetting step of insetting a pair of right and left lenses in a spectacle frame. The insetting step includes a step of adjusting lens curves of the right and left lenses by at least making a lens curve of an R1 surface of each of the pair of right and left lenses inset in the spectacle frame to a frame curve of the front of the spectacle frame and by making a relatively large lens curve of the R1 surface of the lens of the pair of right and left lenses approximate to a relatively small lens curve of the R1 surface of the lens thereof. The insetting step further includes a step of adjusting, on the basis of this item of data, lens thicknesses of the right and left lenses by making a thickness of the lens having a relatively small central thickness and a relatively small edge thickness with respect to the pair of right and left lenses approximate to a thickness of the lens having a relatively large central thickness and a relatively large edge thickness of the lens thereof.

In each of the method according to the first through fourth aspects, each adjustment is preferably performed based on a prescription of a user of the spectacles. Further, the lens is preferably a plastic lens exhibiting a refractive index on the order of 1.6 to 1.7.

Moreover, the lens is preferably composed of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

According to a fifth aspect of the present invention, there is provided a spectacle lens supplying system comprising a transmitting device installed on the side of transmitting data on spectacle lenses and a spectacle frame when manufacturing spectacles and an arithmetic device connected to the transmitting device via a communications line and installed on the side of machining the spectacle lens. The transmitting device includes a data transmitting unit for transmitting an item of spectacle frame data and a prescription to the arithmetic device. The arithmetic device includes a unit for adjusting lens curves of R1 surfaces of right and left lenses, a unit for adjusting lens thicknesses of the right and left lenses, a unit for adjusting lens curves and frame curves of the R1 surfaces of the right and left lenses and a unit for outputting these items of data.

According to a sixth aspect of the present invention, there is provided a system for supplying a spectacle lens, comprising a transmitting device installed on the side of transmitting data on spectacle lenses and a spectacle frame when manufacturing spectacles and an arithmetic device connected to the transmitting device via a communications line and installed on the side of machining the spectacle lens. The transmitting device includes a data transmitting unit for transmitting an item of spectacle frame data and a prescription to the arithmetic device. The arithmetic device includes a unit for adjusting lens curves of R1 surfaces of right and left lenses, a unit for adjusting lens thicknesses of the right and left lenses and a unit for adjusting frame curves of the R1 surfaces of the right and left lenses. A finishing machine is connected to each of these units, and machining is performed based on data given from the arithmetic device.

According to a seventh aspect of the present invention, there is provided a spectacle lens manufactured and supplied by the manufacturing method and/or by the spectacle lens supplying system.

The lens according to the present invention is characterized by performing the balance adjustment between the lens curves, the central thicknesses and the edge thicknesses of the right and left lenses on the basis of an accurate measurement of the round shape by use of a tracer and further the balance adjustment between the frame curve (curve of the spectacle frame) and the lens curve. When measuring the round shape by the tracer, it is possible to obtain the data for manufacturing a thin lens optimal to a prescription and a shape of the spectacle frame of the user. The present invention is based on such an idea that a lens thickness of a relatively thinned lens is made approximate to a lens thickness of a relatively thickened lens with respect to the right and left lenses while keeping the thinning of the lenses on the basis of the data on the thinnest lens that can be manufactured by use of this tracer in the lens developed based on such an idea that the right and left spectacle lenses have hitherto been separately manufactured and respectively thinned one-sidedly. With respect to an idea contrary to the conventional idea aiming at thinning the lenses one-sidedly, even the relatively thickened lens has the minimum lens thickness measured by the tracer on the basis of the prescription, etc. Hence, substantially even when increasing the thickness of the relatively thin lens, the degree of thinning is not retrogressed under that of the conventional lens. Accordingly, the thinner lens than by the prior art can be obtained, and, further, it is possible to manufacture the well-balanced lenses in terms of the lens curves and the lens thicknesses of the right and left lenses.

Moreover, a lens basic material used for the invention of the present application involves the use of a material exhibiting a high refractive index ($n_d$=1.5 to 1.7), whereby the thinner lens can be manufactured. Then, usable materials for the lens are polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

The above and other objects, features and advantages of the present invention will be explained hereinafter and may be better understood by reference to the drawings and the descriptive matter which follows.

DETAILED DESCRIPTION OF THE PREFERRED EMBODIMENTS

1) Trace of Spectacle Frame

Figure 1:
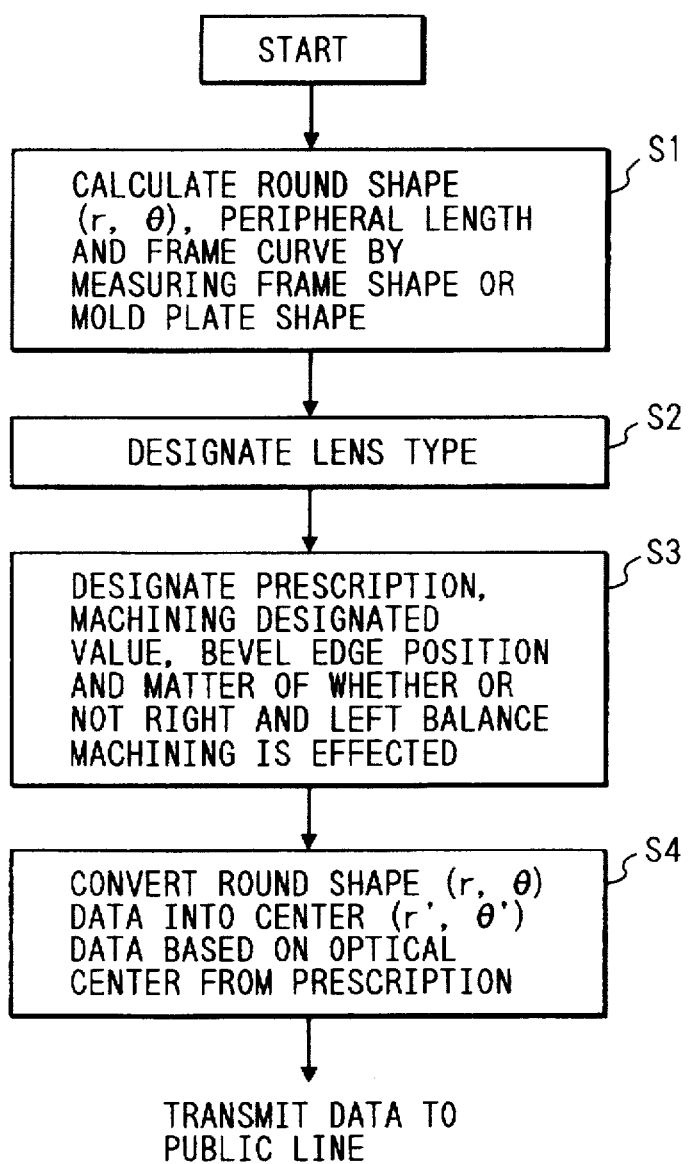
FIG. 1 is a flowchart showing procedures of measuring a shape of a spectacle frame.

According to the present invention, at first, a round shape of a frame is measured by a conventionally practiced method involving the use of a tracer. FIG. 1 shows procedures of measuring a lens curve (LC) and a frame curve (FC) by use of the tracer. To start with, in step 1 (S1), a round shape (r, θ) of the spectacle frame is measured. In the case of two-point frame spectacles, a shape of a mold plate is measured. Further, a peripheral length of the round shape and the frame curve are calculated. Next, a type of the lens is determined based on these items of data (S2). Specified subsequently are a prescription about a lens power, a pupil distance and a height at the center of pupil with respect to the frame, machining data about a position of a far center and a small lens in the case of a progressive focus lens, a bevel edge position, a type of the bevel edge and a matter of whether or not the balance adjustment of the lens curves of the right and left lenses is performed (S3). Previously measured r, θ are converted into values of r', θ' which takes the optical center into consideration from the prescription on the basis of those items of data. These items of data are inputted to a curve balance adjusting unit. The curve balance herein includes a balance adjustment of the lens curves of the right and left lenses and a balance adjustment of the frame curve and the lens curve.

2) Curve Balance Adjustment

Figure 2:
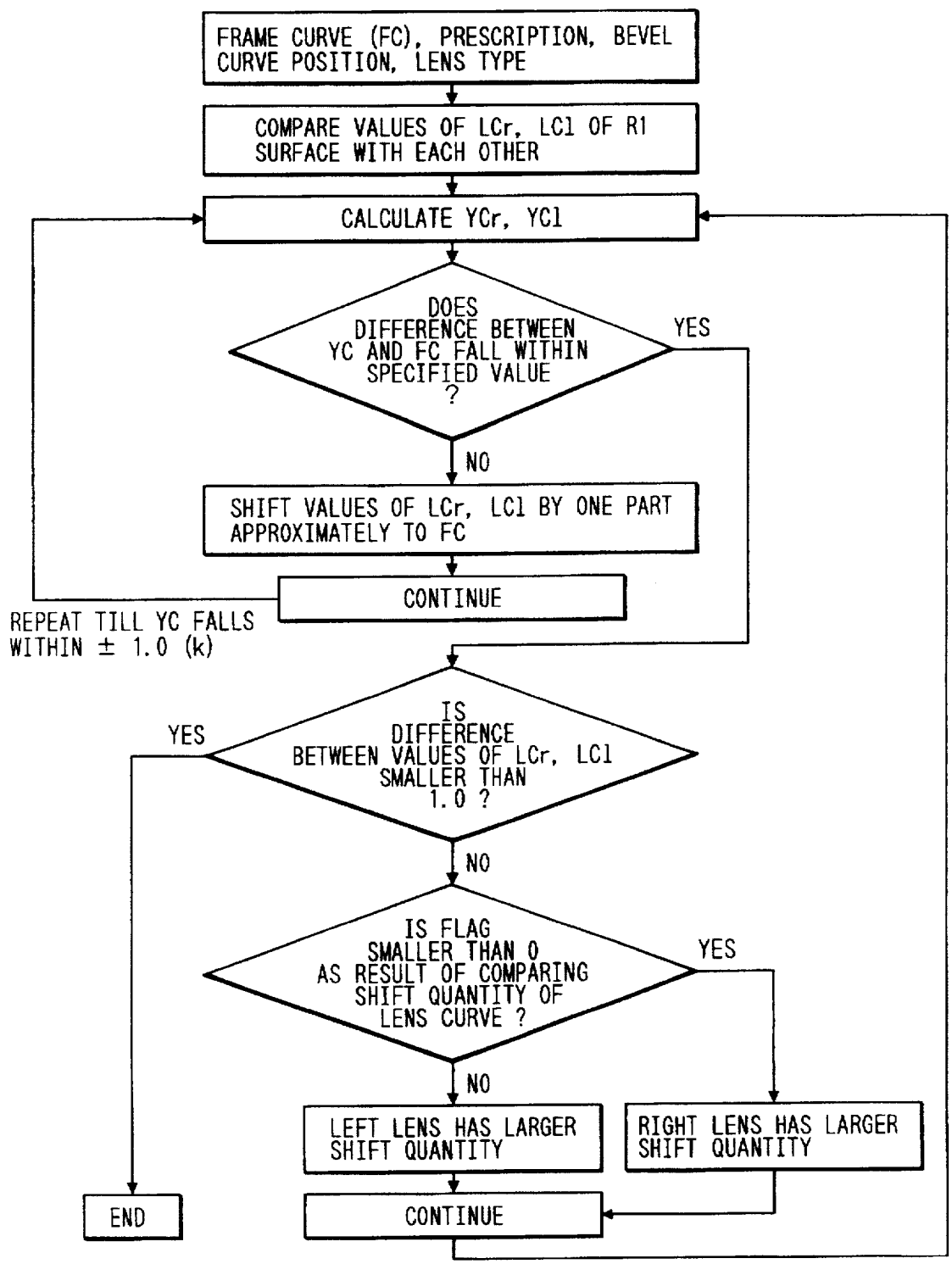
FIG. 2 is a flowchart showing procedures of performing a curve adjustment according to the present invention.
Figure 3:
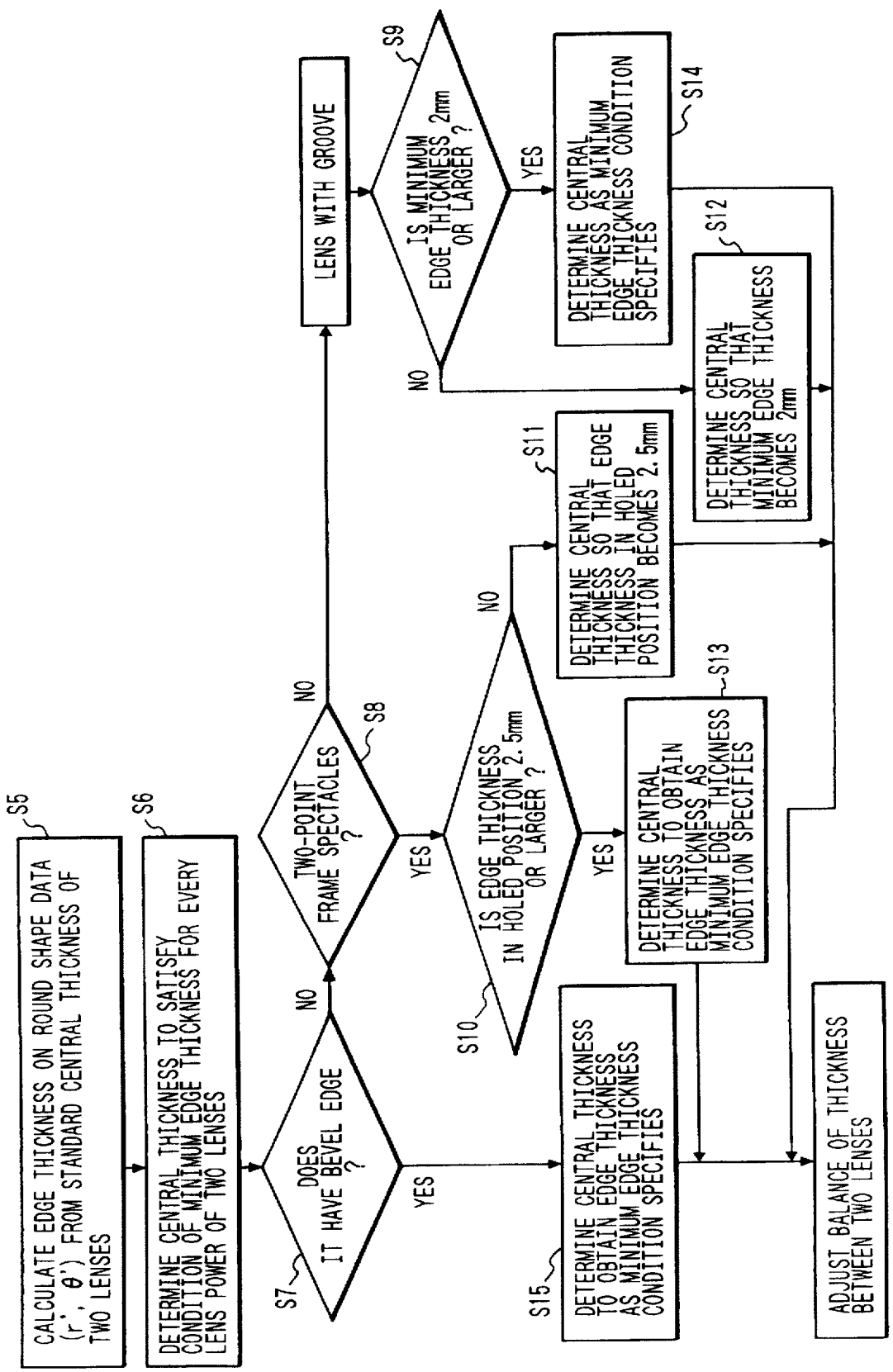
FIG. 3 is a flowchart showing procedures of performing a thickness adjustment of right and left lenses according to the present invention.

A curve balance adjustment will be explained with reference to a flowchart of FIG. 2.

To begin with, lens curves (LCr, LCl) of an R1 surface are selected based on the data processed in steps S1 to S4. Next, right and left bevel edge curves (YCr, YCl) are determined based on this item of lens curve data.

Subsequently, a difference between this item of bevel edge curve data and frame curve data (FC) as a fiducial item of data inputted beforehand is calculated. If a value of the difference calculated herein is not more than a specified value (e.g., a 1.0-curve), a determination is that there is no necessity for correcting a balance between the bevel edge curve and the frame curve, and the operation proceeds to a process of making a comparison between next LCr and LCl. If the difference between the bevel edge curve and the fiducial frame curve data (FC) is larger than the 1.0-curve, however, a shifting process is performed so that the lens curves LCr, LCl approximate the fiducial data FC. There are prepared several types of lenses each having a certain lens curve so that the lens curve changes stepwise. The term "shift" used herein connotes a stepwise approximation to the fiducial frame curve. In this shift, after only one shifting process has been effected by one operation, the data thereof is transmitted to a processing unit where the bevel edge curve is recalculated. This operation is repeated till the difference therebetween becomes equal to or smaller than ±1.0-curve (k). Further, the number of repetitions may be limited. Moreover, as a matter of course, the specified value ±1.0-curve (k) may be varied. The processes explained so far are those of adjusting the balance between the bevel edge curve and the frame curve.

Adjusted next is a balance between the right-and-left lens curves.

When the difference between the bevel edge curve (YC) and the fiducial data FC falls within the specified value, a difference in terms of the curve value between the right and left lens curves (LCr, LCl) of the R1 surface is compared with the specified value. If the difference herein falls within the specified value (e.g., less than the 1.0-curve), there are terminated the balance adjustments between the frame curve and the lens curve and between the right-and-left lens curves, and it follows that optimum values of the lens curve and the bevel edge curve are outputted. If the difference in the lens curve value between the right and left lenses is out of the specified value (e.g., 1.0 or greater curve), there is made a comparison in terms of shift quantity between the right and left lenses on the basis of the left lens. More specifically, a difference between the number of shifts of the left lens and the number of shifts of the right lens is calculated. If a calculated flag (the number of shifts) is larger than 0, the shift quantity becomes larger by shifting the value of the lens curve of the left lens than by making the right-and-left balance adjustment while shifting the value of the lens curve of the right lens. Whereas if the flag is smaller than 0, this indicates that the shift quantity of the right lens increases. Based on this, there is determined which is the optimum, the right lens or the left lens, to shift in the case of adjusting the balance between the right-and-left lens curves and the balance between the frame curve and the lens curve. Then, the operation goes back again to the bevel edge curve calculating unit, wherein the processing is repeated.

With those processes, there are obtained the balance-adjusted lens data between the lens curve and the bevel edge curve with respect to the right and left lenses or the spectacle frame. Thereafter, a lens curve of an R2 surface is determined (unillustrated). The processing procedures which follow may also be taken as another processing method. At first, a lens curve of the R1 surface of the right lens is selected based on the data on the user's prescription, etc. Next, a lens curve that is most approximate to the frame curve is obtained within such a range that an optical problem like an aberration does not arise. Subsequently, the same processing as the right lens is performed on the left lens. Then, the balance between the frame curve and the lens curve can be adjusted by obtaining a difference in the lens curve between the right and left lenses.

3) Thinning of Lens

After the processing stated in the item 2), ETs (edge thicknesses) of the right and left lenses on the round-shape data (r', θ) are calculated based on central thicknesses of the right and left lenses (S5). Then, the central thicknesses satisfying a minimum ET condition for every lens power of the right and left lenses are determined (S6). Next, whether the bevel edge is provided or not is determined (S7). When providing the bevel edge, the central thicknesses satisfying the minimum ET condition is determined in accordance with step S6, and the operation proceeds to the unit for adjusting the balance between the right-and-left lens thicknesses. Whereas if no bevel edge is provided, whether the frame is the two-point frame or not is determined (S8). If not the two-point frame, it follows that a groove is formed in a lens edge surface. A minimum ET (e.g., 2 mm) at this time is specified, and whether an ET is larger than this specified value or not is determined (S9). If the ET is larger than the specified value, the central thickness is set as the minimum ET condition is satisfied, and the operation proceeds to a processing step of a thickness balance adjustment. Whereas if the ET is smaller than the specified value, the central thickness is determined according to the specified value (e.g., 2 mm). When determining that the spectacles are classified as two-point frame spectacles in step S8, a minimum edge thickness (HT) in a holing position is specified in step S10. If the minimum edge thickness is larger than this specified value, an adjustment is made to meet a minimum edge thickness condition, and the operation proceeds to a next step of adjusting a thickness balance between the right and left lenses. Whereas if the minimum edge thickness is smaller than the specified value, the adjustment is still made to meet the minimum edge thickness condition.

4) Next, a lens thickness balance adjustment unit performs a balance adjustment relative to the thicknesses of the right and left lenses on the basis of this item of data and the prescription data. The lens thickness balance adjustment will be explained.

Figure 4:
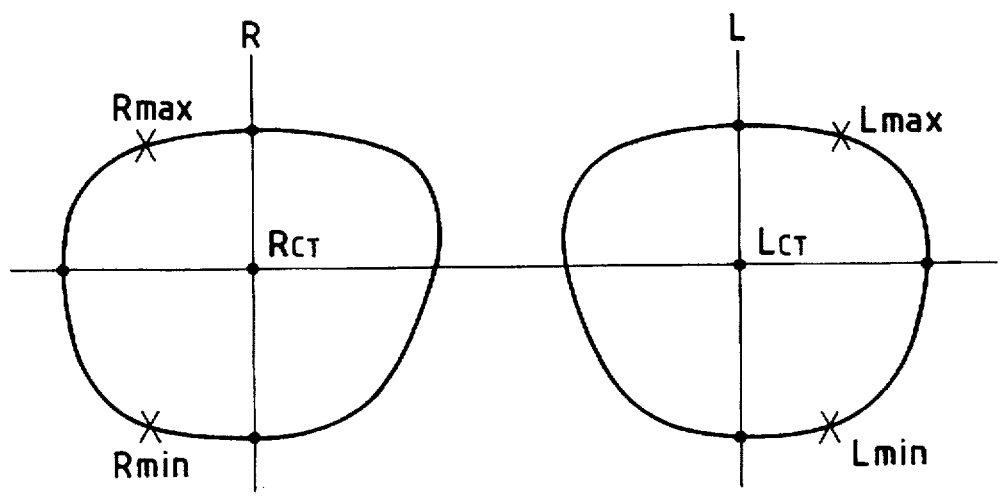
FIG. 4 is a conceptual diagram illustrating a measurement position when effecting the thickness adjustment of the right and left lenses in accordance with this embodiment.

Central thicknesses ($R_{CT}$, $L_{CT}$) and edge thicknesses ($R_{max}$, $L_{max}$ and $R_{min}$, $L_{min}$) of the right and left lenses as shown in FIG. 4 are determined from the lens curves obtained by the curve balance adjustment unit as well as from the prescription. These values are inputted to the lens thickness balance adjustment unit, and the lens thickness adjustment unit calculates values of the lens thicknesses to be adjusted based on the following formula:

when the right lens is thin, $$R'_{CT}=R_{CT}+|R_{max}-L_{max}|\times\alpha$$

and when the left lens is thin, $$L'_{CT}=L_{CT}+|R_{max}-L_{max}|\times\alpha$$

where $\alpha$: the factor of a complementary thickness.

In the case of a (+) lens, $\alpha=0.8$, but in the case of a (−) lens, $\alpha=0.4$. However, as in the case of the following formula, a determination is that the complementary thickness is not required.

$$\alpha\times|R_{max}-L_{max}|\leq 0.3$$

An arbitrary numerical value may be freely set instead of 0.3 in the formula 2.

With the processes effected by the above-described curve balance adjusting unit and lens thickness balance adjustment unit, the set values of the lens curve, the frame curve and the lens thicknesses (central thickness, edge thickness) are outputted. Then, a lens blank having a determined lens curve is employed and at first machined in the round shape measured by the tracer on the basis of these items of data. The lens blank is then machined based on the data obtained from the respective units by a finishing machining, thereby obtaining a lens. This finishing machine may be constructed as a system which is connected to the curve balance adjustment unit and the lens thickness balance adjustment unit, receives the data thereof and automatically performs machining; or alternatively, the machining is carried out by a machine operator operating the finishing machine in accordance with the respective items of data.

Embodiment 2

Figure 5:
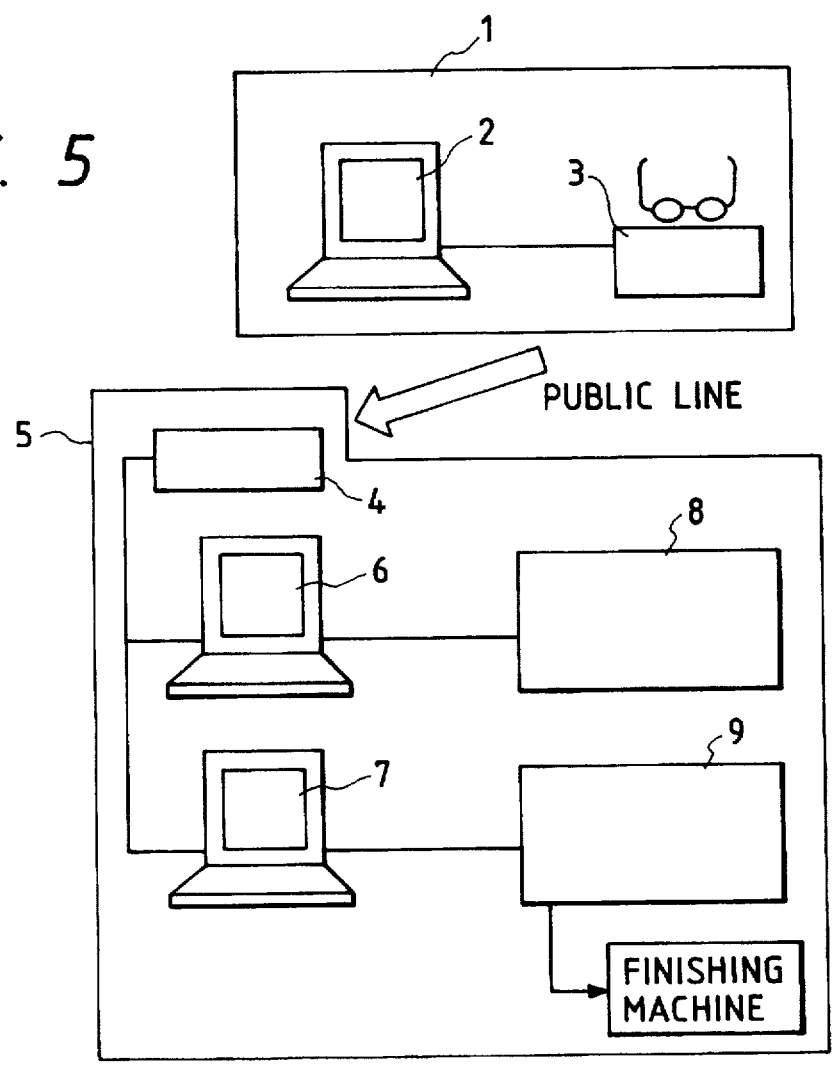
FIG. 5 is a schematic diagram illustrating a supply system of the spectacle lenses in accordance with this embodiment.
Figure 6:
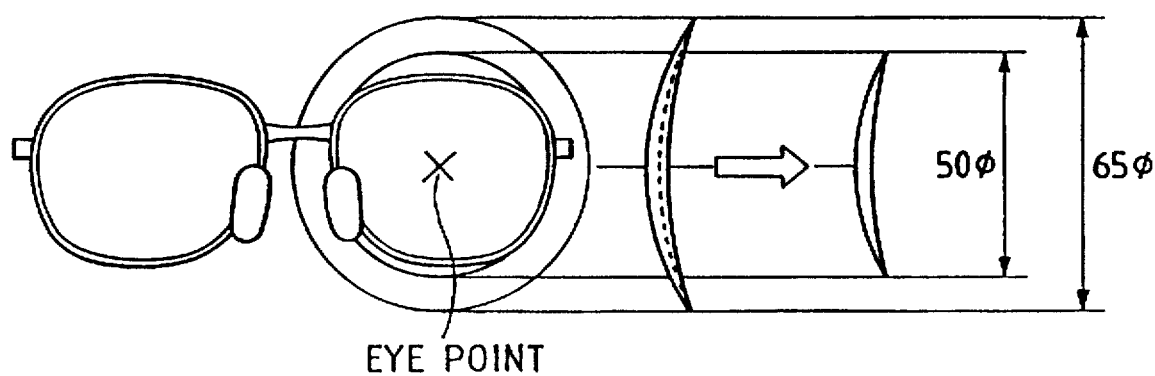
FIG. 6 is a conceptual diagram showing a method of manufacturing the lens on the basis of a designation of an outer diameter in the prior art.
Figure 7A:
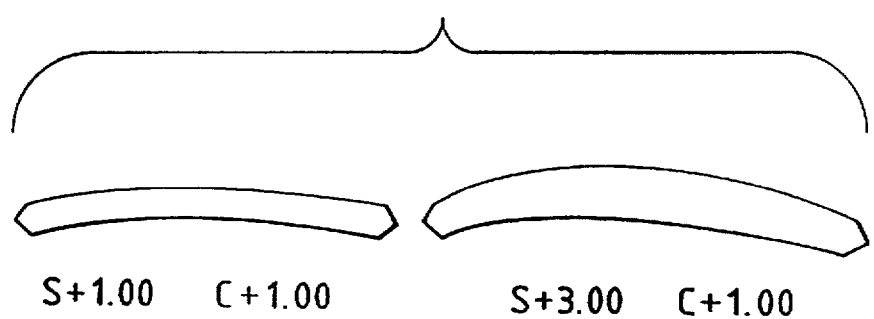
FIGS. 7A and 7B are conceptual diagrams of sections of a pair of right and left spectacle lenses manufactured by the conventional manufacturing method as viewed from above in the horizontal direction.
Figure 7B:
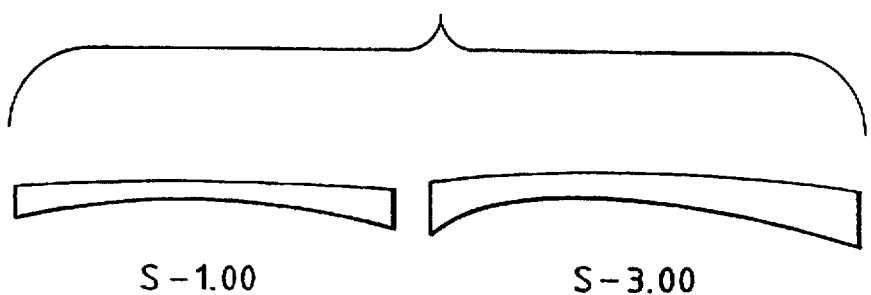

In a next embodiment, according to the present invention, as illustrated in FIG. 5, a data transmitting apparatus is installed in an optician's shop 1, while data receiving apparatus is installed in a lens machining shop, and these communications line (e.g., a VAL), etc. In the optician's shop, there is provided an online terminal computer 2 and a frame shape measuring instrument 3 known as a tracer. The terminal computer 2 is equipped with an input device through a keyboard and a CRT screen display unit and is connected to the public communications line. An item of spectacle lens data, a prescription, etc. are inputted to the terminal computer 2 from the built-in keyboard input device. An item of measured and calculated spectacle frame data is also inputted to the terminal computer 2 from the frame shape measuring instrument 3. Those items of data are transferred online to the machining yard via the public communications line.

A main computer 4 incorporates a spectacle lens machining design program, a bevel edge machining design program, etc. and, on the basis of the inputted data, calculates a lens shape including a bevel edge shape. The main computer 4 then transmits an arithmetic result thereof back to the terminal computer 2 via the public communications line and makes the built-in screen display to display the arithmetic result. The arithmetic result is then transmitted to respective terminal computers 6, 7 in a factory 5 via the LAN. A polishing machine 8 is connected to the terminal computer 6. The terminal computer 6 controls the polishing machine 8 in accordance with the arithmetic result transmitted from the main computer 4 and finishes a curvature of the rear surface of the lens, the upper surface of which is previously machined. An NC lens grinding machine 9 is connected to the terminal computer 7 and performs lens edge machining and bevel edge machining in accordance with the arithmetic result transmitted from the terminal computer 7. The curve adjustment unit and the lens thickness control unit according to the present invention are incorporated into the main computer. The optician's shop and the machining factory are connected through the thus constructed system. Accordingly, the optician's shop is capable of ordering the balance-adjusted lens between the lens thicknesses and between the lens curves of the right and left lenses as well as between the frame curve of the spectacle frame and the lens curve of the lens from the lens factory simply by transmitting the respective items of data to the machining factory. It follows that the spectacles can be fabricated simply by insetting the lenses in the spectacle frames. As a matter of course, in the factory, the machining can be done even when a man participates in the machining on the basis of the data transmitted from the optician's shop without connecting each terminal to the finishing machine.

The lens according to the present invention may be finished by separately performing the lens curve adjustment of the right and left lenses, the lens thickness adjustment of the right and left lenses and the adjustment between the lens curve and the frame curve or by performing these adjustments in combination.

As discussed above, according to the present invention, even when there is a difference in the lens thickness between the right and left lenses, the well-balanced spectacles can be obtained, wherein there is almost no difference both in the lens curve and in the thickness between the right and left lenses. A well-shaped product is thereby obtained. Further, the balance in terms of the thicknesses of the right and left lenses is adjusted, and, hence, there is eliminated the difference in weight between the right and left lenses. This in turn eliminates both a deviation of the spectacle due to the difference in terms of the lens weights and an uncomfortable feeling caused when wearing the spectacles. Particularly in the case of the two-point frame type spectacles with their edge thicknesses being conspicuous, there is a large effect produced by eliminating the difference in the edge thickness between the right and left lenses. Moreover, in the lens according to the present invention, the round shape is at first measured accurately, and the machining is carried out on the basis of such a condition that the thinnest lens in terms of design can be manufactured. Hence, there is obtained the spectacle lens in which the lens machined according to the present invention is small both in weight and in thickness. Further, the balance between the frame curve, the lens curve and the bevel edge curve is adjusted, and, therefore, a load on the lens after being inserted in the frame is decreased, and a life-span of the spectacles increases In the case of using the progressive lens, an optimal prism thinning quantity is applied in consideration of the layout and the shape of the spectacle frame, whereby the well-balanced, light-weight and thin lens can be manufactured. Further, when the optician's shop is connected via the communications network, etc. to the machining shop, the optician's shop measures the round shape by use of the tracer and also a prescription of the user and simply transmit the data thereof to the machining shop. It is enough for the optician's shop to only receive the machined lens. For this reason, the machining in the optician's shop is eliminated, and this largely reduces the load on the shop.

It is apparent that, in this invention, a wide range of different working modes can be formed based on the invention without deviating from the spirit and scope of the invention. This invention is not restricted by its specific working modes except being limited by the appended claims.

What is claimed is:

1. A method of manufacturing a pair of spectacle lenses, comprising:
    providing a pair of right and left lenses; and
    adjusting lens curves of the right and left lenses by making a relatively large lens curve of an R1 surface of one lens of the pair approximate to a relatively small lens curve of the R1 surface of the other lens of the pair.

2. The method according to claim 1, wherein the adjusting is performed based on a prescription of a user of the spectacles.

3. A spectacle lens pair manufactured by said manufacturing method according to claim 1.

4. A spectacle lens pair manufactured by said manufacturing method according to claim 2.

5. The method of according to claim 1, wherein each lens is a plastic lens having a refractive index on the order of 1.6 to 1.7.

6. The method of according to claim 2, wherein each lens is a plastic lens having a refractive index on the order of 1.6 to 1.7.

7. The method according to claim 1, wherein a material of each lens is selected from the croup consisting of polymethyl methacrylate and polymer thereof, polycarbonate, diethylene glycol bis allyl carbonate, (bromide) bisphenol A di(meth)acrylate polymer and copolymer thereof, polymer of urethane modified a monomer of (bromide) bisphenol A mono(meth)acrylate and copolymer thereof, polyester and unsaturated polyester, acrylonitrile-styrene copolymer, vinyl chloride, polyurethane and epoxy resin.

8. The method of manufacturing the according to claim 2, wherein a material of each lens is selected from the group consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

9. A method of manufacturing a pair of spectacle lenses, comprising:
    providing a pair of right and left lenses; and
    adjusting lens thicknesses of the right and left lenses by making a thickness of one lens of the pair a having a relatively large central thickness and a relatively large edge thickness approximate to a thickness of the other lens of the pair having a relatively small central thickness and a relatively small edge thickness.

10. The method according to claim 9, wherein the adjusting is performed based on a prescription of a user of the spectacles.

11. A spectacle lens pair manufactured by said manufacturing method according to claim 9.

12. A spectacle lens pair manufactured by said manufacturing method according to claim 10.

13. The method of according to claim 9, wherein each lens is a plastic lens having a refractive index on the order of 1.6 to 1.7.

14. The method according to claim 10, wherein each lens is a plastic lens having a refractive index on the order of 1.6 to 1.7.

15. The method according to claim 9, wherein a material of each lens is selected from the group consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

16. The method according to claim 10, wherein is material of each lens is selected from the group consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

17. A method of manufacturing a pair of spectacle lenses, comprising:
    providing a pair of right and left lenses; and
    adjusting lens curves relative to a frame curve of the front of a spectacle frame by making a lens curve of an R1 surface of each of the pair of right and left lenses approximate to the frame curve of the front of the spectacle frame.

18. The method according to claim 17, wherein the adjusting is performed based on a prescription of a user of the spectacles.

19. A spectacle lens pair manufactured by said manufacturing method and/or by said spectacle lens according to claim 17.

20. A spectacle lens pair manufactured by said manufacturing method according to claim 18.

21. The method of according to claim 17, wherein each lens is a plastic lens having a refractive index on the order of 1.6 to 1.7.

22. The method of according to claim 18, wherein each lens is a plastic lens having a refractive index on the order of 1.6 to 1.7.

23. The method according to claim 17, wherein a material of each lens is selected from the group consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono meth)acrylate and copolymer thereof, polyester and unsaturated polyester, acrylonitrile-styrene copolymer, vinyl chloride, polyurethane and epoxy resin.

24. The method according to claim 18, wherein a material of each lens is selected from the group consisted of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

25. A method of manufacturing a pair of spectacle lenses, comprising:
    providing a pair of right and left lenses;
    adjusting lens curves of the right and left lenses by at least making a lens curve of an R1 surface of each of the pair of right and left lenses approximate to a frame curve of the front of a spectacle frame and making a relatively large lens curve of the R1 surface of one lens of the pair of right and left lenses approximate to a relatively small lens curve of the R1 surface of the other lens of the pair; and adjusting, based on the adjusted lens curves, lens thicknesses of based on the adjusted lens curves, lens thicknesses of the pair of right and left lenses by making a thickness of one lens of the pair having a relatively small central thickness and a relatively small edge thickness approximate to a thickness of the other lens of the pair having a relatively large central thickness and a relatively large edge thickness.

26. The method according to claim 25, wherein each adjusting step is performed based on a prescription of a user of the spectacles.

27. A spectacle lens pair by said manufacturing method according to claim 25.

28. A spectacle lens pair manufactured by said manufacturing method according to claim 26.

29. The method according to claim 25, wherein each lens is a plastic lens having a refractive index on the order of 1.6 to 1.7.

30. The method of according to claim 26, wherein each lens is a plastic lens having a refractive index on the order of 1.6 to 1.7.

31. The method according to claim 25, wherein a material of each lens is selected from the croup consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

32. The method according to claim 26, wherein a material of each lens is selected from the group consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

33. A system for supplying a pair of spectacle lenses, comprising:

a transmitting device which transmits, from a first location, data on spectacle lenses and a spectacle frame for manufacturing spectacles; and an arithmetic device connected to said transmitting device via a communication line and installed at a second location where machining of the spectacle lenses is conducted, said transmitting device including:

a data transmitting unit for transmitting an item of spectacle frame data and a prescription to said arithmetic device, said arithmetic device including:

means for calculating an adjustment of lens curves of R1 surfaces of right and left lenses relative to each other;

means for calculating an adjustment of lens thicknesses of the right and left lenses relative to each other;

means for calculating an adjustment of lens curves of the R1 surfaces of the right and left lenses relative to a frame curve of the spectacle frame; and means for outputting the calculated adjustments.

34. A spectacle lens pair supplied by said supplying system according to claim 33.

35. A system for supplying a pair of spectacle lenses, comprising:

a transmitting device which transmits, from a first location, data on spectacle lenses and a spectacle frame for manufacturing spectacles; and an arithmetic device connected to said transmitting device via a communications line and installed at a second location where machining of the spectacle lenses is conducted, said transmitting device including:

a data transmitting unit for transmitting an item of spectacle frame data and a prescription to said arithmetic device, said arithmetic device including:

means for calculating an adjustment of lens curves of R1 surfaces of right and left lenses relative to each other;

means for calculating an adjustment of lens thicknesses of the right and left lenses relative to each other; and means for calculating an adjustment of lens curves of the R1 surfaces of the right and left lenses relative to a frame curve of the spectacle frame, wherein a finishing machine is connected to said arithmetic device to receive the calculated adjustments and to machine the pair of lenses based thereon.

36. A spectacle lens pair supplied by said system according to claim 35.

37. A method of manufacturing spectacles, comprising;

providing a pair of right and left lenses;

adjusting lens curves of the right and left lenses by making a relatively large lens curve of an R1 surface of one lens of the pair approximate to a relatively small lens curve of the R1 surface of the other lens of the pair; and insetting the pair of lenses in a spectacle frame.

38. A spectacle lens manufactured by the method according to claim 37.

39. A method of manufacturing spectacles, comprising:

providing a pair of right and left lenses;

adjusting lens thicknesses of the right and left lenses by making a thickness of one lens of the pair having a relatively large central thickness and a relatively large edge thickness approximate to a thickness of the other lens a of the pair having a relatively small central thickness and a relatively small edge thickness; and insetting the pair of lenses in a spectacle frame.

40. A method of manufacturing spectacles, comprising;

providing a pair of right and left lenses and a spectacle frame;

adjusting a lens curve relative to a frame curve of the front of the spectacle frame by making a lens curve of an R1 surface of each of the pair of right and left lenses approximate to the frame curve of the front of the spectacle frame; and insetting the pair of lenses in the spectacle frame.

41. A method of manufacturing spectacles, comprising:

providing a pair of right and left lenses and a spectacle frame;

adjusting lens curves of the right and left lenses by at least making a lens curve of an R1 surface of each of the pair of right and left lenses approximate to a frame curve of the front of the spectacle frame and making a relatively large lens curve of the R1 surface of one lens of the pair of right and left lenses approximate to a relatively small lens curve of the R1 surface of the other lens of the pair;

adjusting, based on the adjusted lens curves, lens thicknesses of the pair of right and left lenses by making a thickness of one lens of the pair having a relatively small central thickness and a relatively small edge thickness approximate to a thickness of the other lens of the pair having a relatively large central thickness and a relatively large edge thickness; and insetting the pair of lenses in the spectacle frame.

42. A method of manufacturing a lens of a pair of spectacle lenses, comprising:

adjusting a lens curve of the lens such that a relatively large lens curve of an R1 surface and a relatively small lens curve of another R1 surface of the pair of lenses are approximate to each other; and adjusting a thickness of said lens such that a thickness of one of the pair of lenses having a relatively large central thickness and a relatively large edge thickness is approximate to the thickness of the other lens of the pair having a relatively small central thickness and a relatively small edge thickness.

43. The method according to claim 42, wherein each adjusting step is performed based on a prescription of a user of the spectacle lenses.

44. The method according to claim 42, wherein said lens is a plastic lens having a refractive index on the order of 1.6 to 1.7.

45. The method according to claim 42, wherein a material of said lens is selected from the group consisting of polymethyl methacrylate and polymer thereof, polycarbonate, diethylene glycol bis allyl carbonate, (bromide) bisphenol A di(meth)acrylate polymer and copolymer thereof, polymer of urethane modified monomer of (bromide) bisphenol A mono(meth)acrylate and copolymer thereof, polyester and unsaturated polyester, acrylonitrile-styrene copolymer, vinyl chloride, polyurethane and epoxy resin.

* * * * *